United States Patent [19]

Childs

[11] Patent Number: 4,500,856
[45] Date of Patent: Feb. 19, 1985

[54] SIMPLIFIED MINIMUM SHIFT KEYING MODULATOR

[75] Inventor: William H. Childs, Gaithersburg, Md.

[73] Assignee: Communications Satellite Corporation, Washington, D.C.

[21] Appl. No.: 330,917

[22] Filed: Dec. 15, 1981

[51] Int. Cl.³ .................. H03C 3/02; H04L 27/12
[52] U.S. Cl. .................. 332/9 R; 332/16 R; 332/22; 332/23 R; 375/47; 375/50; 375/64
[58] Field of Search .................. 332/9 R, 23 R, 16 R, 332/22; 375/47, 50, 64, 61

[56] References Cited

U.S. PATENT DOCUMENTS 3,605,017 9/1971 Chertok et al. .................. 375/61 X

OTHER PUBLICATIONS

Morihiro, Y. et al., "A 100 M bit/S Prototype MSK Modem for Satellite Communication" IEEE, Trans. Communications, v. COM-27, No. 10. pp. 1512–1518, Oct. 1979.

Primary Examiner—Eugene R. LaRoche
Assistant Examiner—W. R. Paxman
Attorney, Agent, or Firm—Sughrue, Mion, Zinn, Macpeak, and Seas

[57] ABSTRACT

An MSK modulator having a simple construction with only a single necessary adjustment. The digital bit stream to be modulated is fed directly to the control input of a $0,\pi$ phase shifter in a single-sideband modulator. A phase shift circuit is used to couple an IF signal to the IF signal input of the single-sideband modulator with the phase thereof adjusted by 0 or $\pi$ in response to two contiguous bits of the input data stream so as to maintain phase continuity in the output of the modulator for all possible bit combinations in the input stream.

11 Claims, 16 Drawing Figures

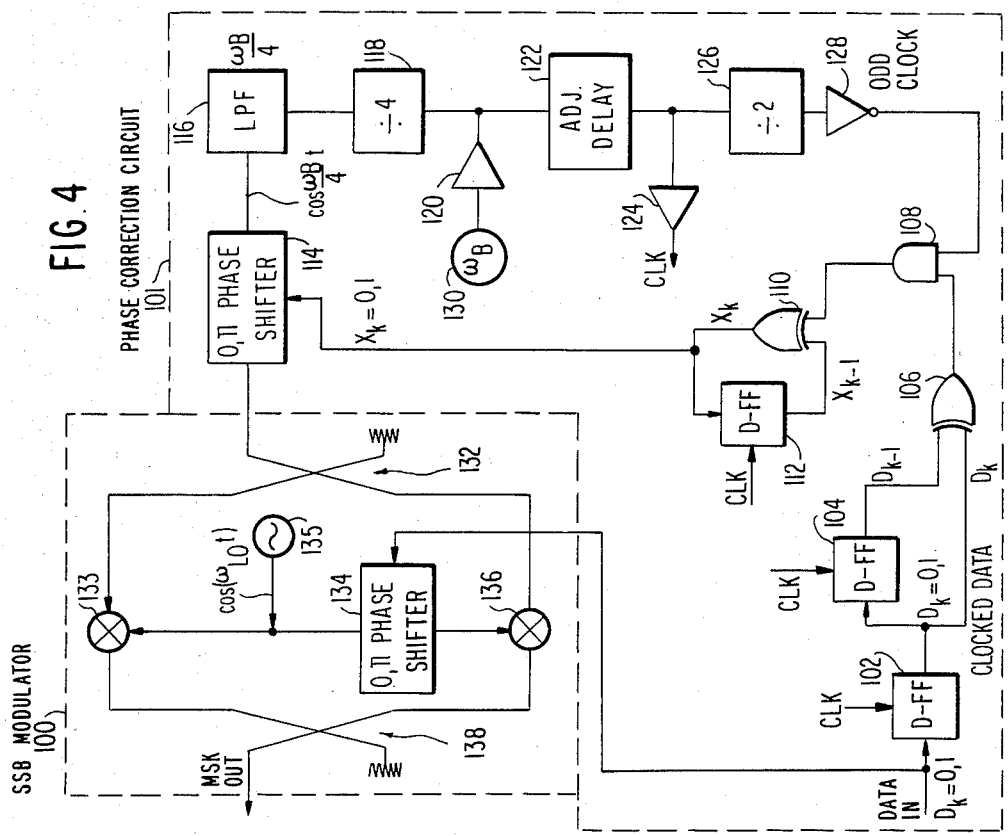
FIG. 4
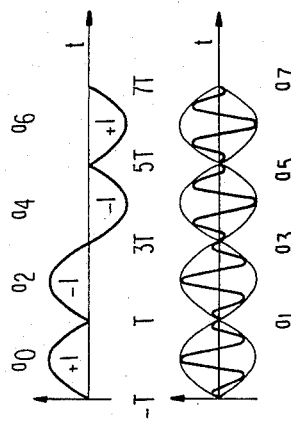
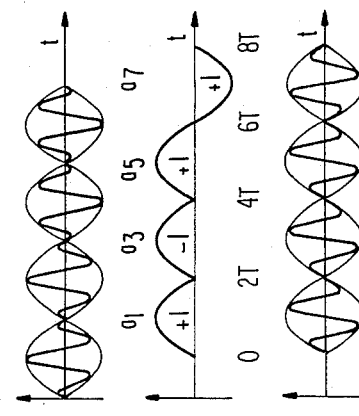
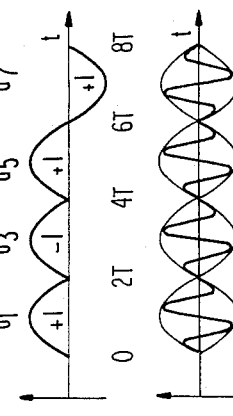
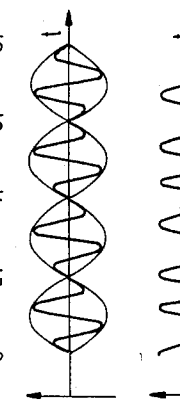
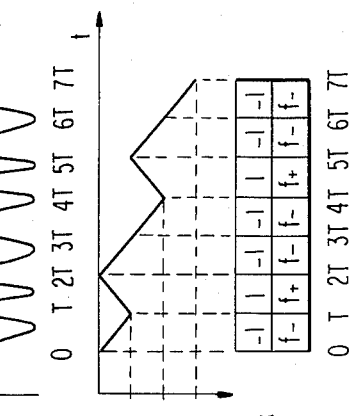
PRIOR ART FIG. 3a  $a_I(t)\cos(\pi \frac{t}{2T})$
PRIOR ART FIG. 3b  $a_I(t)\cos(\pi \frac{t}{2T})\cdot\cos 2\pi f_c t$
PRIOR ART FIG. 3c  $a_Q(t)\sin(\pi \frac{t}{2T})$
PRIOR ART FIG. 3d  $a_Q(t)\sin(\pi \frac{t}{2T})\cdot\sin 2\pi f_c t$
PRIOR ART FIG. 3e  $s(t)$
PRIOR ART FIG. 3f  $\theta(t)$

SIMPLIFIED MINIMUM SHIFT KEYING MODULATOR

BACKGROUND OF THE INVENTION

The ever increasing demand for digital communications, coupled with the fixed bandwidth available for such transmissions has increased the desirability of providing digital modulation techniques requiring a minimum bandwidth for a given bit error rate.

Perhaps the most commonly used digital modulation technique to date has been QPSK (Quaternary Phase Shift Keying). According to this technique, an incoming serial digital bit stream is divided into two separate bit streams which are used to modulate in-phase and quadrature components of a carrier signal. The modulated in-phase and quadrature components of the carrier are then summed together to produce the output QPSK signal. For certain bit combinations in the incoming bit stream, the output QPSK signal can have phase transitions of as much as 180 degrees. This gives rise to a problem of adjacent channel interference.

Specifically, in order to comply with spectrum requirements, an output QPSK signal must be band limited with a bandpass filter. The band limited QPSK signal does not have a constant envelope. In fact, the envelope can go to zero due to the 180 degree phase transitions. In a satellite repeater, the received QPSK signal must be hard limited to restore the constant envelope. Unfortunately the restoration of the constant envelope also restores the sidelobes of the QPSK signal which were removed by the bandpass filtering at the transmitter side. These sidelobes produce interference in adjacent channels.

In an attempt to at least partially overcome these disadvantages of QPSK, a technique known as OQPSK (Offset Quaternary Phase Shift Keying) has been developed. According to this technique, the incoming serial bit stream is divided into two channels, the same as QPSK. However, unlike QPSK in which the two separated bit streams are aligned at bit transition times, the two separated bit streams in OQPSK are phase shifted by 180 degrees relative to one another. By doing so, the maximum phase transition which can occur in the output OQPSK signal is limited to 90 degrees. When an OQPSK signal is utilized in a communication system as described, the effects of band limiting in the transmitter and hard limiting at the repeater produce less adjacent channel interference than with QPSK. Nonetheless, the amount of adjacent channel interference is still significant and unacceptable for some applications. Thus, it is desirable to further reduce the adverse effects of regenerated sidebands caused by discontinuities in the phase of a transmitted signal.

This has been done with a technique known as MSK (Minimum Shift Keying). This technique may be viewed as an adaptation of OQPSK modulation wherein, instead of using rectangular pulse weighting as is the case of OQPSK, sinusoidal weighting is employed. This technique is described in an article entitled "Minimum Shift Keying: A Spectrally Efficient Modulation", *IEEE Communications Magazine,* July 1979, by S. Pasupathy. An example of this technique will be discussed with reference to FIGS. 1, 2 and 3a-3f. It is assumed that the bit sequence which it is desired to be transmitted is $+1, +1, -1, -1, -1, +1, +1, +1$. This bit stream is divided into two bit streams which are modulated with signals of $\cos(\pi t/2T)$ and $\sin(\pi t/2T)$, respectively. The resultant signals are shown in FIGS. 3a and 3c. In the indicated waveforms, $a_I(t)$ and $a_Q(t)$ represent the respective separated bit streams. These signals are then used to modulate respective carriers in the form of $\cos 2\pi f_c t$ and $\sin 2\pi f_c t$, where $f_c$ is the carrier signal frequency. The resulting waveforms are shown in FIGS. 3b and 3d. The signals of FIGS. 3b and 3d are summed to produce the output waveform s(t) as shown in FIG. 3e.

FIG. 3f is a phase transition diagram corresponding to the signal of FIG. 3e. From this diagram, it may readily be seen that there are no discontinuous phase transitions in the output signal produced by the MSK technique. Due to the elimination of discontinuous phase transitions, the output spectral density of MSK has lower sidelobes than either QPSK or OQPSK. This is illustrated in FIG. 1 which is a spectral density diagram comparing the two techniques.

Another way of viewing MSK is to consider it as a special case of FSK (Frequency Shift Keying). It may be demonstrated mathematically that an MSK signal is equivalent to an FSK signal with signalling frequencies of $f_c+(\frac{1}{4})T$ and $f_c-(\frac{1}{4})T$, that is, a frequency deviation of $\Delta f=(\frac{1}{2})T$. Because this is the minimum frequency spacing which permits two FSK signals to be coherently orthogonal, the term "minimum shift" keying is applied.

A typical prior art modulator for MSK is shown in the block diagram of FIG. 2. In this modulator, the mixer or multiplier 20 produces two phase coherent signals at frequencies of $f_c+(\frac{1}{4})T$ and $f_c-(\frac{1}{4})T$. These are filtered by upper and lower frequency bandpass filters 22 and 24 to produce signals of the form:

$$s_1(t) = (\tfrac{1}{2}) \cos(2\pi f_c t + \pi(t/2)T)$$

and $$s_2(t) = (\tfrac{1}{2}) \cos(2\pi f_c t - \pi(t/2)T).$$

The sum and difference of the signals $s_1(t)$ and $s_2(t)$ are formed by the adder 26 and subtractor 28. The resultant signals x(t) and y(t) are fed to multipliers 30 and 32 where they are modulated with the signals $a_I(t)$ and $a_Q(t)$.

Although MSK would appear to have some direct advantages due to its inherent improved spectral properties, direct generation of an MSK waveform utilizing a modulator such as that shown in FIG. 2 is both difficult and expensive. The multipliers required are expensive and the timing requirements quite tight. Numerous timing adjustments are necessary and the frequency deviation of 0.5T implies difficult, and perhaps impossible in some situations, filtering requirements. For these reasons, MSK modulation has not been widely used.

SUMMARY OF THE INVENTION

Accordingly, it is an object of the present invention to provide an MSK modulator which is simple in configuration and inexpensive.

It is a further object of the invention to provide such an MSK modulator in which the number of timing adjustments is a minimum.

Yet further, it is an object of the present invention to provide such an MSK modulator in which difficult filtering requirements are not imposed.

In accordance with these and other objects of the invention, there is provided an MSK modulator based upon a single-side band modulator which receives an inputted data signal as a modulation signal. An IF signal is coupled to an input of the single sideband modulator with a phase adjusted such that the output signal from the single sideband modulator has phase continuity for all possible bit combinations of the input digital signal. Specifically, the frequency of an IF signal source is divided by four and then adjusted in phase at the input of the single-sideband modulator by a digital circuit operating in response to the input data bit stream so as to maintain the desired phase continuity. The phase of the frequency-divided IF signal is left unchanged or shifted by $\pi$ depending upon the state of the present received input bit and the bit immediately prior thereto.

BRIEF DESCRIPTION OF THE DRAWINGS

FIG. 3a–3e are waveform diagrams illustrating the generation of an MSK waveform by the modulator of FIG. 2 and FIG. 3f is a phase diagram corresponding to the output waveform shown in FIG. 3e;

FIG. 4 is a block diagram of an MSK modulator constructed in accordance with the invention;

DESCRIPTION OF THE PREFERRED EMBODIMENTS

Figure 1:
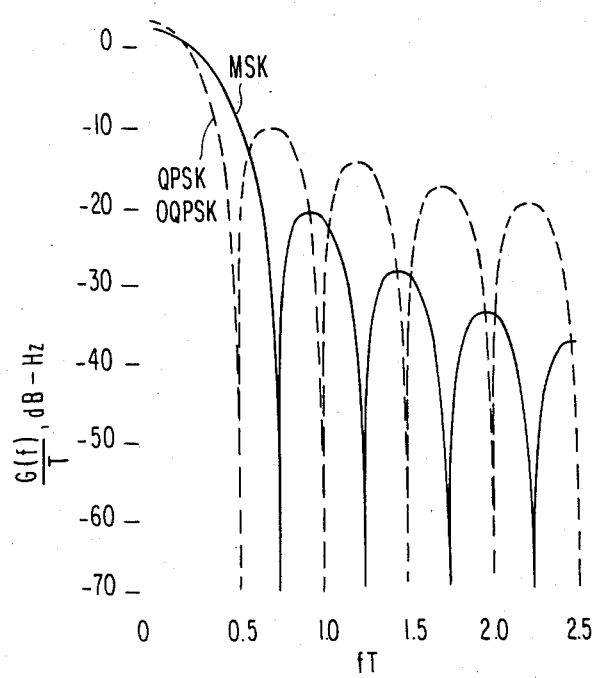
FIG. 1 is a spectral density chart comparing the spectral densities of QPSK, OQPSK and MSK modulation techniques.
Figure 2:
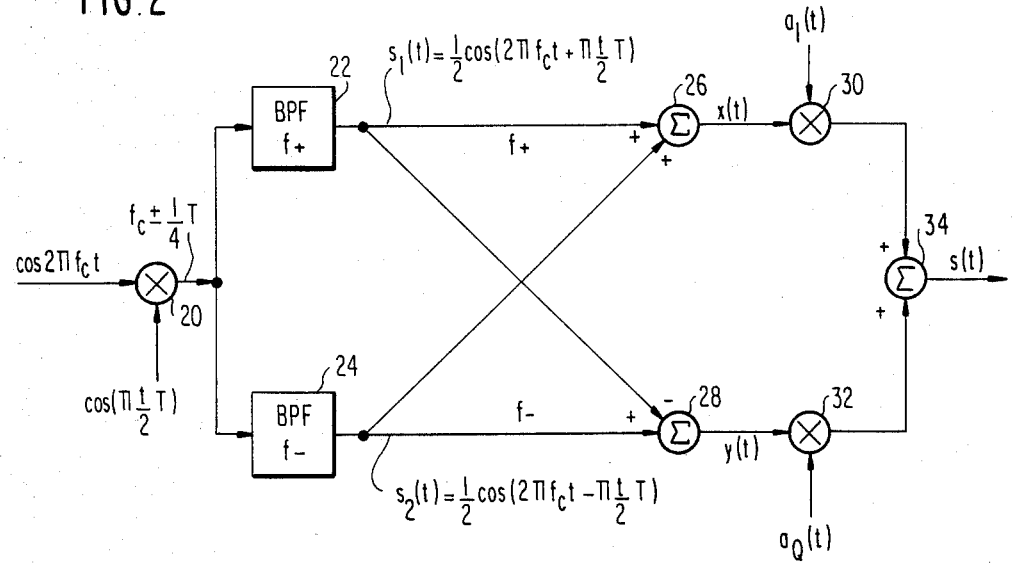
FIG. 2 is a block diagram of a prior art MSK modulator.
Figure 5A:
FIG. 5a–5f are a series of waveforms used for explaining the operation of the circuit of FIG. 4.
Figure 5B:
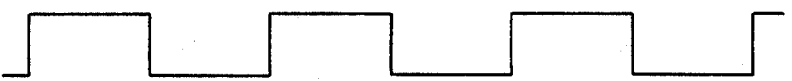
Figure 5C:
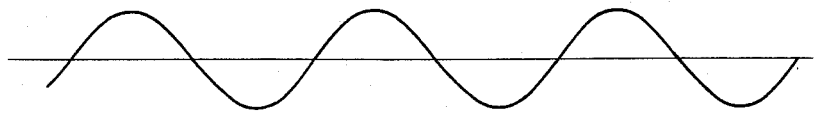
Figure 5D:
Figure 5E:
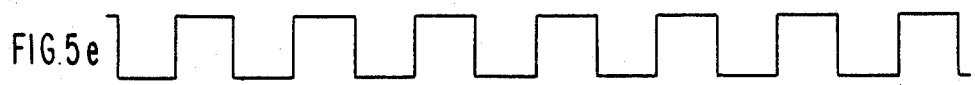
Figure 5F:

Referring now to FIG. 4, an MSK modulator of the present invention will be decribed.

The MSK modulator of the invention includes two primary sections, an SSB modulator 100 and a phase connection circuit 101. In the SSB modulator 100, a carrier signal oscillator 135 outputs a signal $\cos \omega_{LO} t$ which is coupled to a first multiplier 133 directly and through a $0, \pi$ phase shifter 134 to a second multiplier 136. The $0, \pi$ phase shifter 134 couples the signal $\cos \omega_{LO} t$ directly to one input of the multiplier 136 when the incoming data signal $D_k$ is at 0 and with a 180 degree phase shift when $D_k$ is 1. A phase correction signal is inputted to the other inputs of the multipliers 133 and 136 via a hybrid coupler 132. The outputs of the multipliers 133 and 136 are combined through a second hybrid coupler 138 to provide the output MSK signal.

The phase corrector 101 will now be described. The same data which was inputted to the phase shifter 134 is inputted to a D-type flip-flop 102. The output of the flip-flop 102 is coupled to one input of an exclusive-OR gate 106 directly and through a second D-type flip-flop 104 to a second input of the exclusive-OR gate 106. The second D-type flip-flop 104 receives the same clock input as the first D-type flip-flop 102. The output of the exclusive-OR gate 106 is coupled to one input of an AND gate 108.

A second exclusive-OR gate 110 receives as one input thereto the output of the AND gate 108. A third D-type flip-flop has its data input coupled to the output of the second exclusive-OR gate 110 and its output connected to the second input of the second exclusive-OR gate 110. The third D-type flip-flop 112 receives the same clock input as the D-type flip-flops 102 and 104. The output of the second exclusive-OR gate 110 is coupled to the control input of a second $0, \pi$ phase shifter 114, the signal input to which is a signal of the form $\cos (\omega_B t / 4)$. This signal is generated by dividing the output of a clock oscillator 130, buffered through an amplifier 120, by a divide-by-four counter 118 and then filtering it with a low-pass filter 116.

The buffered clock output is also passed through an adjustable delay circuit 122 and through a clock buffer amplifier 124 to each of the clock inputs of the D-type flip-flops 102, 104 and 112. Further, the output of the adjustable delay circuit 122 is divided in frequency with a divide-by-two circuit 126. The output of the divide-by-two circuit 126 is inverted to produce an ODD CLOCK signal which is coupled to the second input of the AND gate 108.

The fact that the above-described circuitry does produce the desired MSK waveform will now be demonstrated mathematically.

The output signal OUT can be represented generally by:

$$\text{OUT} = \frac{e^{j[(\omega_{LO} - \omega_{IF})t - \phi_{IF}]}}{2} [\sqrt{C_{1L}} + \sqrt{C_{2L}} \, e^{j\phi_{LO}}] e^{j\phi_o} +$$

$$\frac{e^{j[(\omega_{LO} + \omega_{IF})t + \phi_{IF}]}}{2} [\sqrt{C_{1U}} - \sqrt{C_{2U}} \, e^{j\phi_{LO}}] e^{j\phi_o}.$$

where $C_{1L}$, $C_{2L}$, $C_{1U}$ and $C_{2U}$ are the lower sideband coupling coefficients of the multipliers 133 and 136 and the upper sideband coupling coefficients of the multipliers 133 and 136, respectively, $\phi_{IF}$ is an IF phase and $\phi_o$ a reference phase. If the two multipliers are matched in upper and lower sideband responses, then $C_{1L} = C_{2L} = C_L$ and $C_{1U} = C_{2U} = C_U$. Hence:

$$\text{OUT} = \frac{\sqrt{C_L}}{2} e^{j[(\omega_{LO} - \omega_{IF})t - \phi_{IF}]} [1 + e^{j\phi_{LO}}] e^{j\phi_o} +$$

$$\frac{\sqrt{C_U}}{2} e^{j[(\omega_{LO} + \omega_{IF})t + \phi_{IF}]} [1 - e^{j\phi_{LO}}] e^{j\phi_o}$$

In this equation, when $\phi_{LO} = 0$, a lower sideband signal is present, and when $\phi_{LO} = \pi$, an upper sideband signal is present. This equation represents the well-known operation of a single sideband modulator.

If it is further assumed that the multipliers are matched for both upper and lower sidebands, $C_L = C_U = C$, and hence the above equation can be rewritten in terms of $\psi_{IF}(t)$ as:

$$\text{OUT} = e^{j\phi_o} \frac{\sqrt{C}}{2} \{ e^{j[\omega_{LO} t - \psi_{IF}(t)]} [1 + e^{j\phi_{LO}}] +$$

$$e^{j[\omega_{LO} t + \psi_{IF}(t)]} [1 - e^{j\phi_{LO}}] \}, \text{ where}$$

$$\psi_{IF}(t) = \frac{\omega_B t}{4} + X_k \cdot \pi + \phi_{IF}, \text{ where}$$

$X_k$ is a control signal derived from the input data, and where.

$$\omega_B = 2\pi R_B = 2\pi / T_B \text{ for a bit rate of } R_B.$$

It may thus be seen that the desired MSK waveform can be generated by controlling $X_k$ ($X_k = 0, 1$) in accordance with the input data so as to maintain a continuous phase.

The expression for $\psi_{IF}(t)$ can be rewritten without loss of generality by setting $\phi_{IF}=0$. Thus, $$\psi_{IF}(t) = \frac{\omega_B t}{4} + X_k\pi.$$

The data switching intervals occur at times $t=kT_B$, for integer values of k. At the k-th time interval, $kT_B<t<(k+1)T_B$, the data $D_k$ must be one of 0 and 1. $D_k=1$ causes $\phi_{LO}=\pi$, and $D_k=0$ causes $\phi_{LO}=0$, that is, $\phi_{LO}=D_k\pi$. Thus, in the interval $kT_B<t<(k+1)T_B$:

$$OUT = e^{j\phi_0} e^{j[\omega LOt - \frac{\omega B t}{4} - X_k\pi]}, \text{ for } D_k = 0, \text{ and}$$

$$OUT = e^{j\phi_0} e^{j[\omega LOt + \frac{\omega B t}{4} + X_k\pi]}, \text{ for } D_k = 1.$$

The transition from the interval $k-1$ to the interval k will now be considered. For this transition, if $D_k=D_{k-1}$, then $X_k=X_{k-1}$, and hence the phase is continuous as desired. However, if $D_{k-1}=0$ and $D_k=1$, at one side of the transition time, that is, at $t=kT_B-\delta_t$:

$$OUT = e^{j[\omega LOkT_B - \frac{\pi}{2}k - X_k\pi]}$$

and, at the other side of the transition time, that is, at $t=kT_B-\delta t$:

$$OUT = e^{j[\omega LOkT_B + \frac{\pi}{2}k + X_k\pi]}.$$

If k is even, the phase is thus continuous and $X_k=X_{k-1}$, while if k is odd, the phase is discontinuous by and $X_k=\overline{X_{k-1}}$ (where $\overline{X_{k-1}}$ indicates the binary complement of $X_{k-1}$). Likewise, for the transition $D_{k-1}$ to $D_k=0$, it may be shown that $X_k=X_{k-1}$ if k is even and $X_k=\overline{X_{k-1}}$ if k is odd.

In the circuit of FIG. 4, phase continuity is maintained by proper phasing of the input signal to the SSB modulator 100 by the phase corrector 101. The phasing is done in accordance with the input data $D_k$ such that:

if $D_k+D_{k-1}=0$, then $X_k=X_{k-1}$, if $D_k+D_{k-1}=1$ and k is even, then $X_k=\overline{X_{k-1}}$, and if $D_k+d_{k-1}=1$ and k is odd, then $X_k=X_{k-1}$.

The phase corrector 101 operates in accordance with these three relationships.

In the circuitry of FIG. 4, the only adjustment required is that of the adjustable delay circuit 122. All that is required is that the adjustable delay circuit be set so that the zero crossings of the odd clock and the cosine wave signal ($\omega_B/4$) outputted by the low-pass filter 116 are in coincidence. This is in contrast to the prior art MSK modulators in which a large number of complex adjustments were required.

Figure 6:
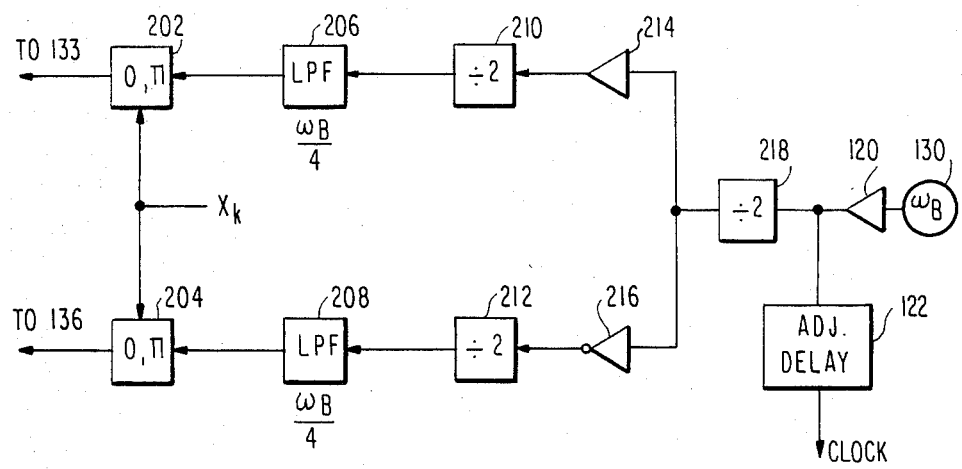
FIG. 6 is a block diagram of a portion of an MSK modulator of the invention of an alternative embodiment.

An alternative embodiment is illustrated in FIG. 6. FIG. 6, which shows only a portion of the complete MSK modulator, shows circuitry which replaces the hybrid coupler 132, $0,\pi$ phase shifter 114, filter 116 and divide-by-four counter 118. In this embodiment, the output of the buffer 120 is fed to the input of a divide-by-two counter 218 which divides the clock frequency $\omega_B$ by 2. The output of the divide-by-two counter is coupled to inputs of a buffer amplifier 214 and an inverting buffer amplifier 216. The outputs of the latter two circuits are fed to inputs of identical divide-by-two counters 210 and 212. The outputs of these are filtered by low-pass filters 206 and 208 to produce cosine wave signals which are 180° different in phase from one another. The outputs of the low-pass filters 206 and 208 are coupled to signal inputs of $0,\pi$ phase shifters 202 and 204, the control inputs of which are coupled to receive the phase control signal $X_k$. The outputs of the phase shifters 202 and 204 are in turn coupled to the corresponding inputs of multipliers 133 and 136. The embodiment of FIG. 6 may be used with signals at any frequency but is particularly well adapted for use for lower frequencies.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. An MSK modulator comprising:
    a single-sideband modulator receiving an input data signal as a modulating signal;
    a source of an IF signal; and
    means for coupling said IF signal to an IF signal input of said single sideband modulator with a phase such that an output signal from said single sideband modulator has phase continuity for all bit combinations of said input data signal.

2. The MSK modulator of claim 1 wherein said coupling means comprises means for adjusting the phase of said IF signal in accordance with said input data signal.

3. The MSK modulator of claim 2 wherein said coupling means comprises means for adjusting said phase in an amount determined by two contiguous bits of said input data signal.

4. The MSK modulator of claim 3 wherein said coupling means comprises logic circuit means operating in response to two contiguous bits of said input data signal and further comprising means for producing a clock signal for operating said logic circuitry in response to said IF signal and means for adjusting a timing relationship between said clock signal and said IF signal.

5. The MSK modulator of any of claims 1-4 wherein the frequency of said IF signal is one-fourth the bit rate of said input data signal.

6. The MSK modulator of claim 1 wherein said coupling means comprises means for performing $0,\pi$ phase switching of said IF signal.

7. An MSK modulator comprising:
    a single sideband modulator;
    an IF signal source for producing an IF signal;
    a $0,\pi$ phase shifter coupling said IF signal to an IF signal input of said single sideband modulator; and
    logic circuit means operating in response to a digital input signal inputted to a modulation signal input of said single sideband modulator for controlling a phase shift imparted by said $0,\pi$ phase shifter to said IF signal such that an output signal from said single sideband modulator is phase continuous for all bit combinations of said digital input signal.

8. The MSK modulator of claim 7 further comprising means for producing a clock signal from said IF signal for operating said logic circuit means, and means for adjusting a phase relationship between said clock signal and said IF signal.

9. The MSK modulator of claim 8 wherein the frequency of said IF signal is one-fourth the bit rate of said digital input signal.

10. An MSK modulator comprising:
first and second multipliers;
a local oscillator signal source having an output coupled to one input of said first multiplier;
a first $0,\pi$ phase shifter having a signal input coupled to said output of said local oscillator signal source, an output coupled to a first input of said second multiplier, and a control input coupled to receive a bit stream signal to be modulated upon said output of said local oscillator signal source;
a first hybrid coupler receiving inputs from outputs of said first and second multipliers, an output of said MSK modulator being produced at a first output of said first hybrid coupler;
a second hybrid coupler having outputs coupled to second inputs of said first and second multipliers;
a first flip-flop receiving as a data input said bit stream signal;
a second flip-flop receiving as a data input an output of said first flip-flop;
a first exclusive-OR gate having a first input coupled to an output of said first flip-flop and a second input coupled to an output of said second flip-flop;
an AND gate having a first input coupled to an output of said first exclusive-OR gate;
a second exclusive-OR gate having a first input coupled to an output of said AND gate;
a third flip-flop having a data input coupled to an output of said second exclusive-OR gate and an output coupled to a second input of said second exclusive-OR gate;
an IF signal source;
a divide-by-four circuit receiving said IF signal for dividing the frequency of said IF signal by four;
a low-pass filter having an input coupled to an output of said divide-by-four circuit for producing a sine wave signal from said output of said divide-by-four circuit;
a second $0,\pi$ phase shifter having an input coupled to an output of said low-pass filter and an output coupled to a first input of said second hybrid coupler, a control input of said second $0,\pi$ phase shifter being coupled to said output of said second exclusive-OR gate;
an adjustable time delay circuit having an input coupled to receive said IF signal and an output coupled to clock inputs of said first through third flip-flops; and
a divide-by-two circuit having an input coupled to said output of said adjustable time delay circuit, an output of said divide-by-two circuit being coupled to a second input of said AND gate.

11. An MSK modulator comprising:
first and second multipliers;
a local oscillator signal source having an output coupled to one input of said first multiplier;
a first $0,\pi$ phase shifter having a signal input coupled to said output of said local oscillator signal source, an output coupled to a first input of said second multiplier, and a control input coupled to receive a bit stream signal to be modulated upon said output of said local oscillator signal source;
an IF signal source;
a first divide-by-two circuit receiving said IF signal for dividing the frequency of said IF signal by two;
a second divide-by-two circuit receiving an output of said first divide-by-two circuit;
an inverter having an input coupled to receive said output of said first divide-by-two circuit;
a third divide-by-two circuit receiving an output from said inverter;
first and second low-pass filters receiving inputs from said second and third divide-by-two circuits, respectively;
a second $0,\pi$ phase shifter having a signal input coupled to an output of said first low-pass filter;
a third $0,\pi$ phase shifter having a signal input coupled to an output of said second low-pass filter, outputs of said second and third $0,\pi$ phase shifters being coupled to inputs of said first and second multipliers, respectively;
a hybrid coupler receiving inputs from outputs of said first and second multipliers, an output of said MSK modulator being produced at a first output of said hybrid coupler;
a first flip-flop receiving as a data input said bit stream signal;
a second flip-flop receiving as a data input an output of said first flip-flop;
a first exclusive-OR gate having a first input coupled to an output of said first flip-flop and a second input coupled to an output of said second flip-flop;
an AND gate having a first input coupled to an output of said first exclusive-OR gate;
a second exclusive-OR gate having a first input coupled to an output of said AND gate, an output of said second exclusive-OR gate being coupled to control inputs of said second and third $0,\pi$ phase shifters;
a third flip-flop having a data input coupled to an output of said second exclusive-OR gate and an output coupled to a second input of said second exclusive-OR gate;
an adjustable time delay circuit having an input coupled to receive said IF signal and an output coupled to clock inputs of said first through third flip-flops; and
a fourth divide-by-two circuit having an input coupled to said output of said adjustable time delay circuit, an output of said fourth divide-by-two circuit being coupled to a second input of said AND gate.

* * * * *

UNITED STATES PATENT AND TRADEMARK OFFICE
CERTIFICATE OF CORRECTION

PATENT NO. : 4,500,856

DATED : February 19, 1985

INVENTOR(S) : William Childs

It is certified that error appears in the above-identified patent and that said Letters Patent is hereby corrected as shown below:

Column 3, line 35, change "decribed" to --described--.

Column 5, line 7, after "<", delete "-".

Signed and Sealed this

Tenth Day of September 1985

[SEAL]

Attest:

DONALD J. QUIGG

Attesting Officer    Acting Commissioner of Patents and Trademarks - Designate